US008948555B1

(12) United States Patent
Roth et al.

(10) Patent No.: US 8,948,555 B1
(45) Date of Patent: Feb. 3, 2015

(54) SKEW WAVEGUIDE DIRECTIONAL COUPLER

(71) Applicant: Aurrion, Inc., Goleta, CA (US)

(72) Inventors: Jonathan Edgar Roth, Santa Barbara, CA (US); Brian Koch, Goleta, CA (US); Gregory Alan Fish, Goleta, CA (US)

(73) Assignee: Aurrion, Inc., Goleta, CA (US)

( * ) Notice: Subject to any disclaimer, the term of this patent is extended or adjusted under 35 U.S.C. 154(b) by 0 days.

(21) Appl. No.: 13/899,336

(22) Filed: May 21, 2013

(51) Int. Cl.
*G02B 6/26* (2006.01)
*G02B 6/42* (2006.01)
*G02B 6/27* (2006.01)
*G02B 6/13* (2006.01)

(52) U.S. Cl.
CPC .. *G02B 6/27* (2013.01); *G02B 6/13* (2013.01); *G02B 6/26* (2013.01)
USPC ................... 385/45; 385/27; 385/28; 385/29; 385/30

(58) Field of Classification Search
CPC ............. G02B 6/125; G02B 6/14; G02B 6/24
USPC ................................. 385/27–30, 45
See application file for complete search history.

(56) References Cited

U.S. PATENT DOCUMENTS

| | | | | |
|---|---|---|---|---|
| 5,159,699 | A | * | 10/1992 | de Monts ..................... 385/14 |
| 5,502,783 | A | * | 3/1996 | Wu ............................. 385/42 |
| 6,385,376 | B1 | * | 5/2002 | Bowers et al. .............. 385/50 |
| 6,870,992 | B2 | | 3/2005 | Grosjean et al. |
| 6,987,913 | B2 | | 1/2006 | Blauvelt et al. |
| 7,031,563 | B2 | * | 4/2006 | Block et al. ................. 385/15 |
| 7,050,681 | B2 | | 5/2006 | Blauvelt et al. |
| 7,095,920 | B1 | * | 8/2006 | Little ........................... 385/30 |

OTHER PUBLICATIONS

Ding, et al., "Fabrication tolerant polarization splitter and rotator based on a tapered directional coupler, © 2012 Optical Society of America, Aug. 27, 2012 / vol. 20, No. 18 / Optics Express 20021", (Aug. 27, 2012), 7 pgs.
Doerr, et al., "Wide Bandwidth Silicon Nitride Grating Coupler, IEEE Photonics Technology Letters, Vol. 22, No. 19, October 1, 2010, © 2010 IEEE", (Oct. 19, 2010), pp. 3.
Fang, et al., "High Directivity, Vertical Fiber-to-Chip Coupler with Anisotropically Radiating Grating Teeth; © 2007 Optical Society of America, © OSA 1-55752-834-9", (2007), 2 pgs.
Ishii, et al., "SMT-Compatible Optical-I/O Chip Packaging for Chip-Level Optical Interconnects, (C)2001 IEEE, 2001 Electronic Components and Technology Conference", (2001), pp. 6.
Little, Brent E., et al., "Design Rules for Maximally Flat Wavelength-Insensitive Optical Power Dividers Using Mach—Zehnder Structures, IEEE Photonics Technology Letters, vol. 9, No. 12, Dec. 1997, IEEE 1997,", (Dec. 12, 1997), pp. 3.
Liu, Liu , et al., "Silicon-on-insulator polarization splitting and rotating device for polarization diversity circuits, © 2011 Optical Society of America, (C) 2011 OSA, Jun. 20, 2011 / vol. 19, No. 13 / Optics Express 12646", (Jun. 20, 2011), pp. 6.
Vermeulen, et al., "High-efficiency fiber-to-chip grating couplers realized using an advanced CMOS-compatible Silicon-On-Insulator platform, © 2010 Optical Society of America, (C) 2010 OSA, Aug. 16, 2010 / vol. 18, No. 17 / Optics Express 18278", (2010), 6 pgs.

* cited by examiner

*Primary Examiner* — Ryan Lepisto
(74) *Attorney, Agent, or Firm* — Schwegman Lundberg & Woessner, P.A.

(57) ABSTRACT

Embodiments of the invention describe a skew directional coupler for a plurality of waveguides. Said coupler includes a first waveguide on a first plane and a second waveguide on a second plane separate from the first plane. In embodiments of the invention, the first waveguide is disposed on top of the second waveguide to form an overlapping region of a segment of the first waveguide and a segment of the second waveguide, wherein an optical axis of the segment of the first waveguide is horizontally skew to an optical axis of the segment of the second waveguide, and wherein light is to be passively transmitted between the first and second waveguide segments via mode hybridization.

20 Claims, 7 Drawing Sheets

SKEW WAVEGUIDE DIRECTIONAL COUPLER

FIELD

Embodiments of the invention generally pertain to optical devices and more specifically to waveguide couplers for optical devices

BACKGROUND

Current state of the art solutions for coupling light to and from a waveguide of a photonic integrated circuit (PIC) typically require precise alignment and/or fabrication. In silicon on insulator (SOI) PIC platforms, it is possible for the mode of a waveguide to have submicron dimensions. Edge-to-edge coupling of modes between these PICs would require aligning sub-micron optical modes or would require utilizing spot-size converters to expand and contract these modes for coupling. Surface-normal solutions for coupling sub-micron sized modes between these PICs could be accomplished by expanding and redirecting the beams with gratings or by redirecting the beams with mirrors. Both methods require additional fabrication steps. Fabrication of gratings requires high-resolution lithography, and results in sub-optimal coupling efficiency. Mirrors used for coupling will not expand the mode size, leading to a submicron alignment requirement.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe skew directional couplers that efficiently transfer light between a plurality of waveguides and have a high misalignment tolerance. Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1A:
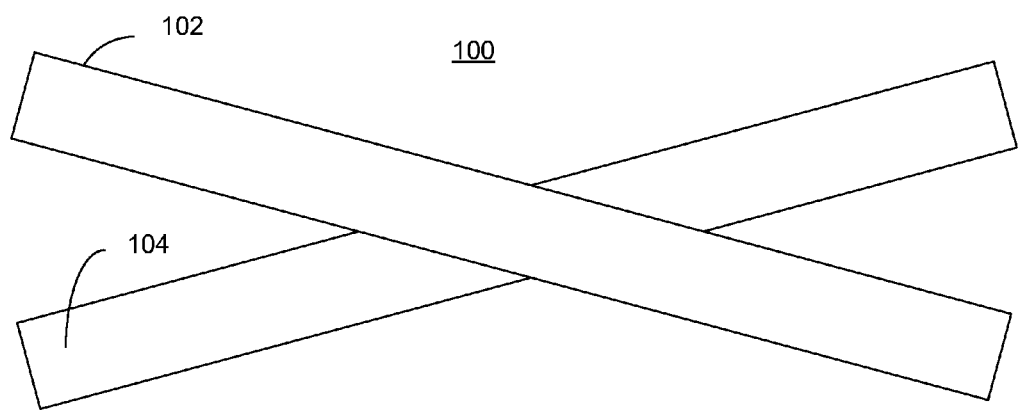
FIG. 1A and FIG. 1B are illustrations of a skew directional coupler for a plurality of waveguides according to an embodiment of the invention.
Figure 1B:
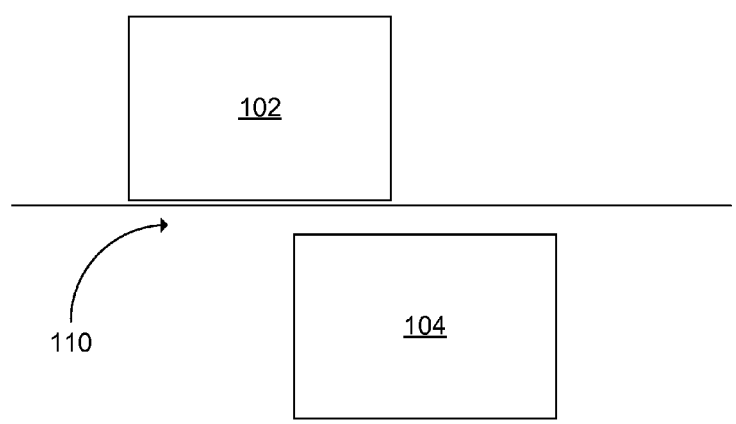

FIG. 1A and FIG. 1B are illustrations of a skew directional coupler for a plurality of waveguides according to an embodiment of the invention. In this embodiment, coupler 100 includes waveguide segment 102 included on a first plane (e.g., formed on a first substrate), and waveguide segment 104 included on a second plane (e.g., formed on a second substrate). FIG. 1A is a top view illustration of coupler 100 showing that said waveguide segments are disposed on top of each other such that their respective optical axes are one different planes and are horizontally skew, thereby allowing light to be passively transmitted between the waveguide segments via mode hybridization.

The design of coupler 100 allows for a very efficient power transfer between waveguides fabricated on different substrates. Furthermore, the alignment tolerance between the different substrates for obtaining efficient power transfer is not limited by the size of the mode to be transferred; therefore, packaging processes utilizing couplers according to embodiments of the invention have less stringent tolerances, and active alignment, in which the optical transmission is measured during assembly and maximized before the final position of parts is fixed, is unnecessary. The effect of increasing misalignment tolerance is beneficial, for example, in silicon on insulator (SOI) photonic integrated circuit (PIC) embodiments where waveguide modes may comprise sub-micron dimensions.

FIG. 1B illustrates a side view illustration of coupler 100, showing waveguide segments 102 and 104 may also be horizontally offset (i.e., the optical axes of said waveguide segments may be horizontally offset). In some embodiments, cladding layer 110 may further be deposited/formed to vertically separate the two waveguide segments.

The critical alignment dimensions to obtain optimal coupling are based, in part, on the crossing angle and separation distance of the waveguide segments; it is not dependent on the mode size. The crossing angle may be limited by the angular tolerance of the assembly equipment, and typical tolerances are favorable to this approach compared to requirements of prior art edge coupling solutions to set the horizontal and vertical alignment offset. Separation distance may be defined precisely by depositing or oxidizing a particular thickness of cladding during fabrication, and hence is not necessarily dependent upon the packaging process.

Figure 2A:
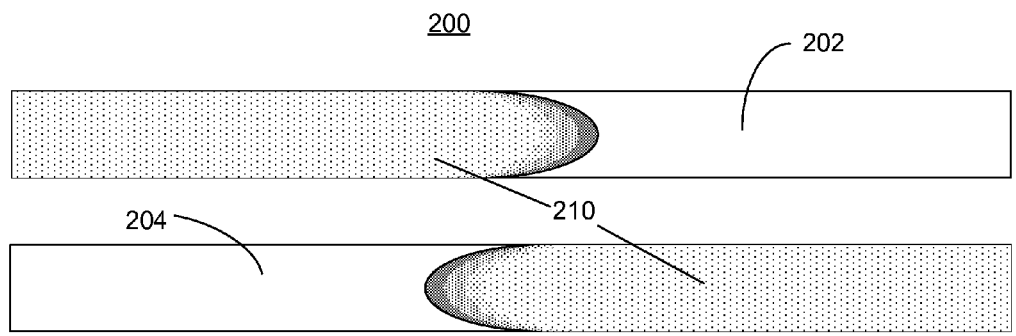
FIG. 2A and FIG. 2B are illustrations of light being transferred between waveguide segments via a skew directional coupler according to an embodiment of the invention.
Figure 2B:
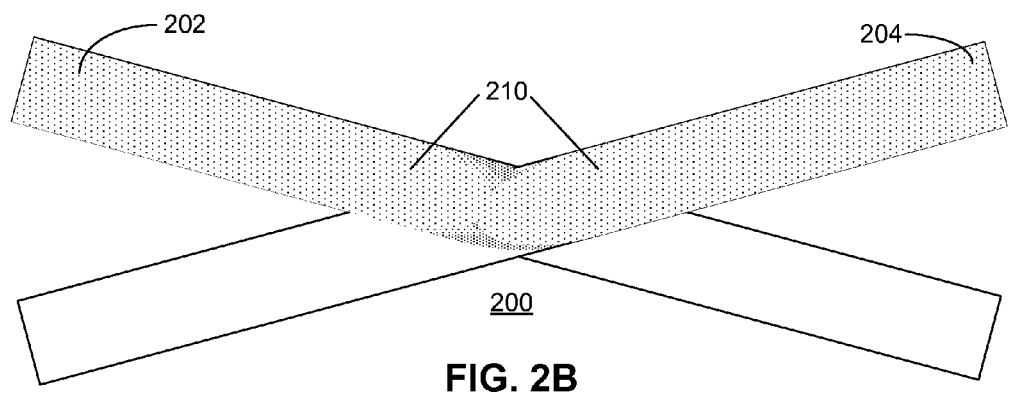

FIG. 2A and FIG. 2B are illustrations of light being transferred between waveguide segments via a skew directional coupler according to an embodiment of the invention. In this embodiment, coupler 200 is shown to include waveguide segments 202 and 204 whose optical axes are on different planes, and light 210 is shown to transition between said waveguide segments.

When waveguide segments 202 and 204 are separated, for example, via a cladding layer, coupler 200 is analogous to a directional coupler, in that power transfers between waveguides 202 and 204 through hybridization of modes in the waveguides when they are brought close together such that their evanescent fields overlap, as shown in the side view of coupler 200 illustrated in FIG. 2A. As discussed above, coupler 200 is a "mode size independent" coupler.

In this embodiment waveguides 202 and 204 are overlapping and crossed such that their optical axes are skew to one another, as shown in the top view of coupler 200 illustrated in FIG. 2B. The waveguide width, crossing angle, and separation distance may be designed to increase the efficiency of the transfer of power from one waveguide core to the other in the crossing.

Several design and fabrication aspects of said waveguide segments may affect the functionality of the coupler. For example, the refractive index of both waveguide core materials may be the same or different, the effective index of both waveguide cross sections may be the same or different, both waveguides may be fabricated from the same material and have the same cross section, and waveguides dimensions may be such that the waveguides have a single polarization mode (e.g., TE or TM mode) in which they are used.

As shown in FIG. 2A and FIG. 2B, in this embodiment the order of the directional coupler 200 may be such that the mode of light 210 transfers once between waveguide segments 202 and 204; in other embodiments, the mode of transferred light may beat between said waveguides several times before transferring completely. A single-transfer function may be more broadband and have more angular misalignment tolerance than said "multiple-beats" transfer function.

Figure 3:
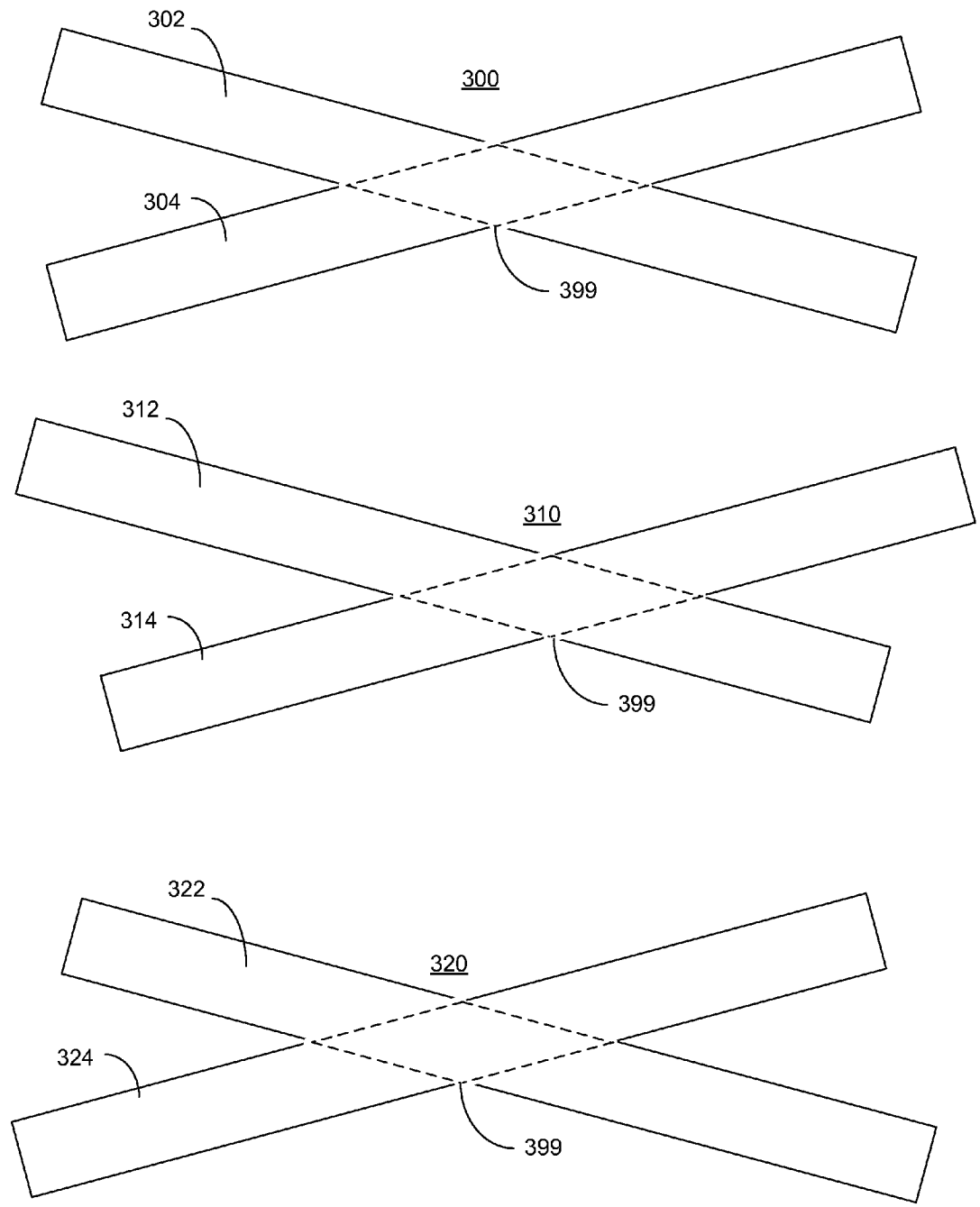
FIG. 3 is an illustration of various waveguide alignments for couplers according to embodiments of the invention.

FIG. 3 is an illustration of various waveguide alignments for couplers according to embodiments of the invention. Coupler 300 is shown to include waveguide segments 302 and 304 overlapping at region 399. As discussed above, embodiments of the invention may transfer power between the waveguides through hybridization of modes in the waveguides; this type of coupling enables a far greater tolerance for misalignment compared to prior art solutions such as edge-to-edge and surface normal coupling solutions.

X/Y-offset/misalignment of either waveguide in the plane of contact does not impact coupling. As shown in FIG. 3, either waveguide can be offset/misaligned in any dimension in the plane of contact (or overlap, for example, when separated by a cladding layer) without affecting the size and shape of the interaction region between waveguides. Thus, coupler 310 includes waveguide segments 312 and 314 that are X/Y misaligned such the overlapping region is in a different location compared to coupler 300, and coupler 320 includes waveguide segments 322 and 324 that are X/Y misaligned such that the overlapping region is in a different location compared to both couplers 300 and 310, and all couplers are still able to transfer light between their respective waveguide segments via similar interaction regions 399.

Figure 4:
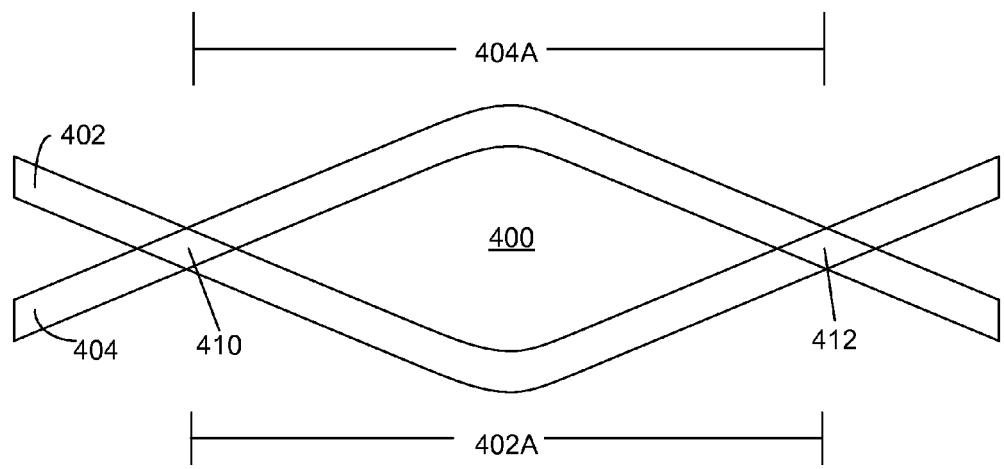
FIG. 4 is an illustration of various waveguide alignments for couplers according to embodiments of the invention.
Figure 4:
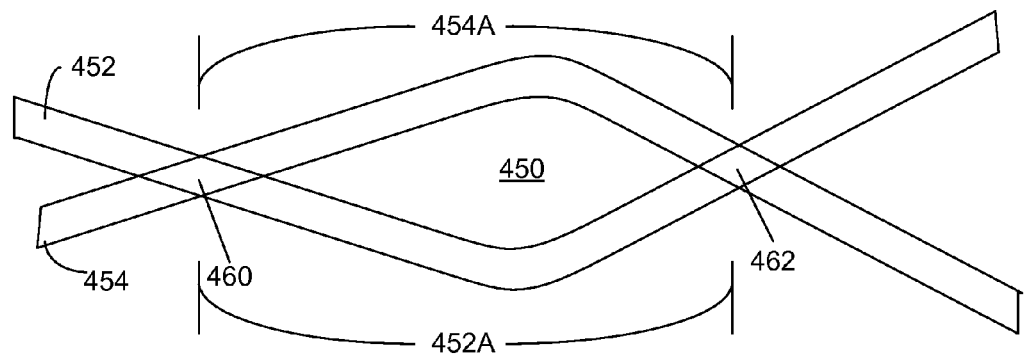

FIG. 4 is an illustration of various waveguide alignments for couplers according to embodiments of the invention. For coupler 400, there are a plurality coupling regions for waveguides 402 and 404—in this embodiment, coupling regions 410 and 412. In this embodiment, regions 410 and 412 are shown to be relatively equal, so each region may couple roughly 50% of the power to be transferred so that the net structure couples 100% of the power. Waveguides 402 and 404 are symmetric so that the lengths of waveguide segments 402A and 404A are the same and the distances between the coupling regions are equal, which prevents variations in phase between the arms if the two arms are misaligned.

For coupler 450, waveguides 452 and 454 are illustrated to be misaligned in both the X/Y-offset and in angle, and thus coupling regions 460 and 462 are illustrated as not being equal. Such a misalignment may occur in a chip-to-chip alignment with poor alignment tolerance. As a result of this misalignment, lengths 452A and 452B are still equal so that there are no phase variations in the interference between the two combining paths and with misalignment. Also, coupling area 460 has increased (compared to coupling area 410 of coupler 400) while coupling area 462 has decreased (compared to coupling area 412 of coupler 400); in other words, the efficiency of coupling area 460 compensates for the inefficiency of coupling area 462, demonstrating that the use of a plurality of waveguide crossings (i.e., a plurality of coupling areas) may reduce the total variation of the coupling as one part increases due to the angle change while the coupling in the other part reduces from the angle change.

Figure 5:
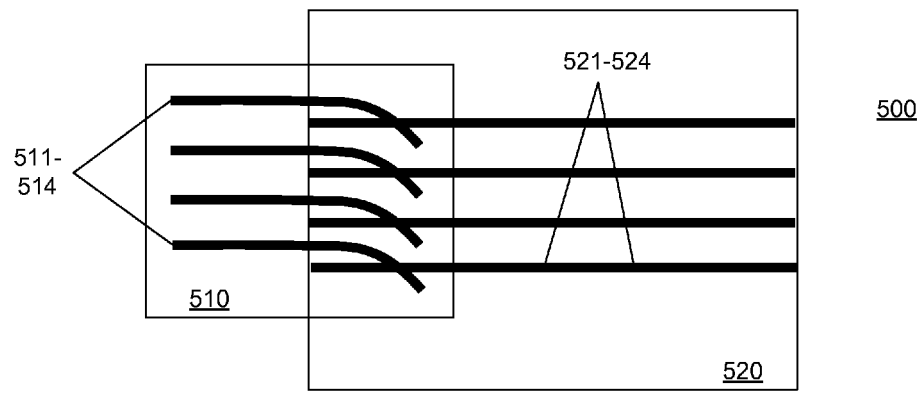
FIG. 5 illustrates photonic integrated circuits utilizing skew directional couplers according to embodiments of the invention.
Figure 5:
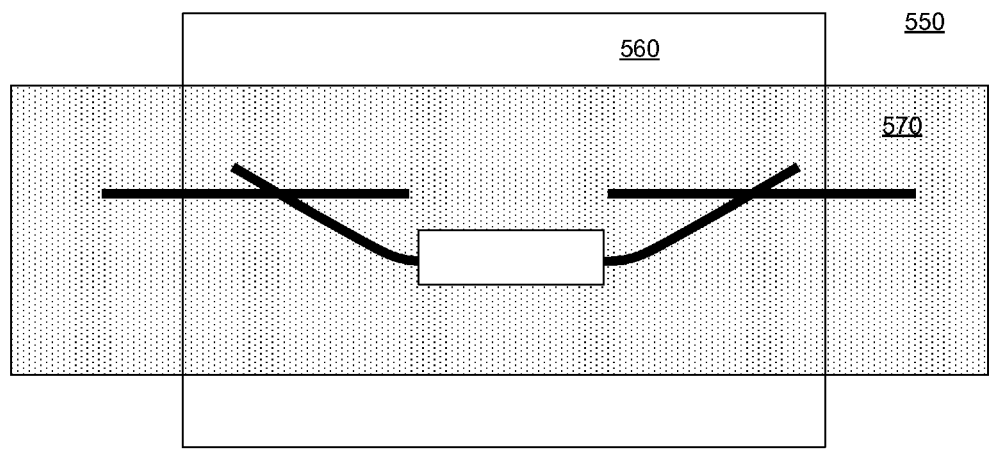

FIG. 5 illustrates PICs utilizing skew directional couplers according to embodiments of the invention. In this example, coupling solution 500 includes photonic flexible interconnect 510 comprising waveguides 511-514 coupled to substrate 520 comprising waveguides 521-524 with relaxed alignment tolerances. Photonic flexible interconnect 510 may comprise, for example, a flexible polymer layer including said waveguides.

Photonic flexible interconnect 510 may be coupled to an array of fibers either using surface-normal gratings or edge-coupled spot size converters. In some embodiments, a photonic flexible interconnect may have a polarization-splitter-rotator. Photonic flexible interconnect 510 is capable of performing several functions, including transferring optical modes' size using spot size converters or grating couplers, transferring between the pitch of an array of fibers and the smaller pitch of an array of waveguide I/O on a PIC chip, and allowing for packaging through the use of a non-rigid flex connection in order to avoid problems associated with coefficient of thermal expansion. These embodiments may be utilized for the C band, for the O band or other wavelength bands.

In an alternative embodiment, separate substrates with PICs are attached face-to-face instead of utilizing photonic flexible interconnect 510. Two chips, for example, may be molecularly bonded to one another face-to-face. Coupling solution 550 is shown to include III-V device 560 attached to fabricated SOI photonics chip 570 with a relaxed alignment tolerance. Such an embodiment may be used when creating a PIC in which two fabrication processes are used which allow fabrication of devices with different properties. In this solution, devices fabricated with the two different sets of capabilities may be seamlessly integrated in a PIC. The resulting chip may not necessarily contain epoxy or any material with a glass transition temperature, so it can withstand high temperatures. In addition, utilizing a molecular bond results in a very strong junction; in contrast, a fillet of epoxy across the edge of a bond, as used in the prior art, is mechanically inferior as the contact surface is not bonded and due to the reliance on the temperature stability of the epoxy is affected.

Figure 6A:
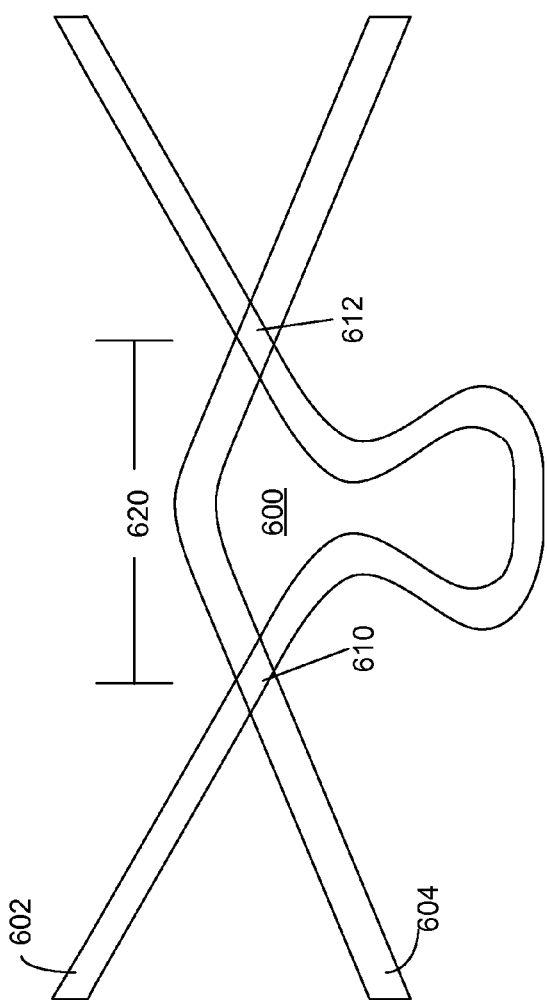
FIG. 6A and FIG. 6B illustrate waveguide crossings for couplers according to embodiments of the invention.
Figure 6B:
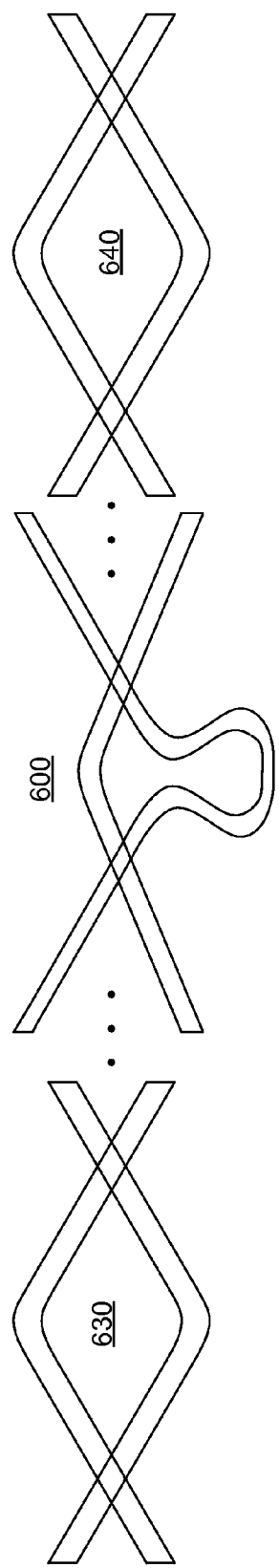

FIG. 6A and FIG. 6B illustrate waveguide crossings for couplers according to embodiments of the invention. In FIG. 6A, coupler 600 is shown to include waveguides 602 and 604 which are illustrated to comprise different lengths—i.e., waveguide 602 is longer than waveguide 604 between crossing regions 610 and 612; in this embodiment, the length difference between the waveguides outside said coupling ranges may not vary with small variations in the alignment between the two waveguides' substrates.

Coupling regions 610 and 612 are thus separated by region 620—this region includes a section of waveguide 602 that is longer than a section of waveguide 604. In contrast to the example embodiments illustrated in FIG. 4, region 620 may be used to introduce a phase shift such that the output could then be accordingly adjusted to give a specific splitting ratio for a plurality of different wavelengths. Therefore the "middle" asymmetric lengths of waveguides 602 and 604 creates a fabrication-tolerant, wide-bandwidth coupler—i.e., a directional coupler with two coupling stages which has both a wider wavelength range of operation and improved fabrication tolerance compared to a directional coupler with "middle" symmetric waveguide lengths.

FIG. 6B illustrates utilizing different types of couplers in a PIC. In this embodiment, fabrication-tolerant, wide-bandwidth coupler 600 is combined with angle misalignment tolerant couplers 630 and 640 (which are illustrated as couplers similar to coupler 400 of FIG. 4A); coupler 630 comprises an angle misalignment input coupler, and coupler 640 comprises an angle misalignment output coupler.

Figure 7:
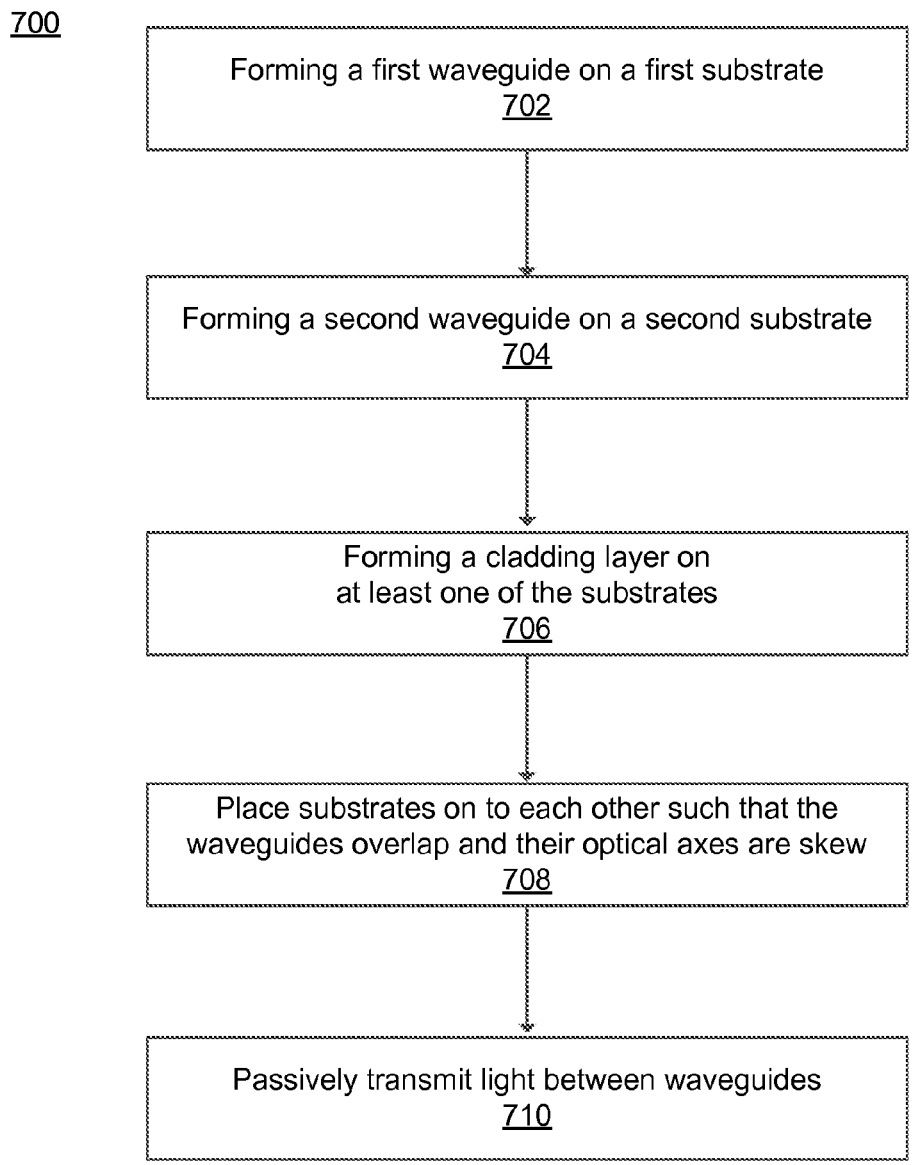
FIG. 7 is a flow diagram for forming a skew directional coupler for a plurality of waveguides according to an embodiment of the invention.

FIG. 7 is a flow diagram for forming a skew directional coupler for a plurality of waveguides according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 700 includes operations for forming a first waveguide on a first substrate, 702, and forming a second waveguide on a second substrate, 704. As described above, said substrates may comprise the same materials or different materials. Furthermore, said first and second waveguides may or may not differ in various physical aspects such as cross-section, refractive index, effective index, etc.

A cladding layer may be formed on one of the substrates, 706. Said cladding layer may be deposited or grown. The first substrate is placed on to the second substrate, 708, such that an optical axis of the first waveguide partially overlaps and is horizontally skew to an optical axis of the second waveguide segment. Thus, an optical coupler is formed in this overlap region wherein light is passively transmitted between the first and second waveguide segments via mode hybridization, 710.

Process 700 therefore describes operations for creating a coupler with a very efficient power transfer between waveguides fabricated on different substrates. Furthermore, the alignment tolerance between the different substrates for obtaining efficient transfer is not limited by the size of the mode or the wavelength of the light to be transferred; therefore, packaging processes utilizing couplers according to embodiments of the invention have less stringent tolerances, and active alignment, in which the optical transmission is measured during assembly and maximized before the final position of parts is fixed, is unnecessary.

The angle at which the waveguide segments are skew may be selected for a particular application. For example, the coupler may be optimized so that both TEO and TMO modes are coupled efficiently, or the coupler may be optimized so that one polarization of TEO and TMO is coupled efficiently and the other is not (thus the coupler may also function as a polarization splitter). Furthermore, crossings at a smaller angle may have less misalignment tolerance but may have lower insertion loss at a specific wavelength range or value.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

The above described embodiments of the invention may comprise SOI or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below; in embodiments of the invention, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials may comprise, for example, lithium niobate (LiNbO3) or lithium tantalate (LiTaO3).

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. An apparatus comprising:
   a first waveguide on a first plane; and
   a second waveguide on a second plane separate from the first plane;
   wherein the first waveguide is disposed on top of the second waveguide to form an overlapping region of a segment of the first waveguide and a segment of the second waveguide, wherein an optical axis of the segment of the first waveguide in the overlapping region is horizontally skew to an optical axis of the segment of the second waveguide in the overlapping region, and wherein light is to be passively transmitted between the first and second waveguide segments via mode hybridization in the overlapping region.

2. The apparatus of claim 1, wherein the first waveguide on the first plane is formed on a first substrate, and the second waveguide on the second plane is formed on a second substrate different than the first substrate.

3. The apparatus of claim 2, further comprising:
   a cladding layer disposed between the first substrate and the second substrate.

4. The apparatus of claim 3, wherein, in the overlapping region, the optical axis of the segment of the first waveguide is further vertically skew with the optical axis of the segment of the second waveguide.

5. The apparatus of claim 2, wherein the first substrate and the second substrate comprise a same material.

6. The apparatus of claim 5, wherein, in the overlapping region, a cross section of the segment of the first waveguide is the same as a cross section of the segment of the second waveguide.

7. The apparatus of claim 2, wherein first substrate and the second substrate comprise different semiconductor materials including at least one of III-V semiconductor material or silicon semiconductor material.

8. The apparatus of claim 1, wherein a core material of the first waveguide and a core material of the second waveguide comprise the same refractive index.

9. The apparatus of claim 8, wherein a cross-section of the first waveguide and a cross-section of the second waveguide comprise the same effective index.

10. The apparatus of claim 1, wherein, in the overlapping region, the segment of the first waveguide is skew to the segment of the second waveguide at a crossing angle such that both TE and TM polarized light is to be efficiently transferred between the segments.

11. The apparatus of claim 1, wherein, in the overlapping region, the segment of the first waveguide segment is skew to the segment of the second waveguide at a crossing angle such that one of TE and TM polarized light is to be efficiently transferred between the segments and that the other of the TE and the TM polarized light is to be inefficiently transferred between the segments.

12. The apparatus of claim 1, further comprising:
    a second overlapping region of a second segment of the first waveguide and a second segment of the second waveguide, wherein an optical axis of the second segment of the first waveguide is horizontally skew to an optical axis of the second segment of the second waveguide, and wherein light is to be passively transmitted between said segments via mode hybridization.

13. The apparatus of claim 12, wherein a portion of the first waveguide between the overlapping regions and a portion of the second waveguide between the overlapping regions comprise a same length.

14. The apparatus of claim 12, wherein a portion of the first waveguide between the overlapping regions and a portion of the second waveguide between the overlapping regions comprise a different length.

15. A method comprising:
    forming a first waveguide on a first substrate;
    forming a second waveguide on a second substrate; and
    placing the first substrate on to the second substrate to form an overlapping region of a segment of the first waveguide and a segment of the second waveguide, wherein an optical axis of the segment of the first waveguide segment in the overlapping region is horizontally skew to an optical axis of the segment of the second waveguide segment in the overlapping region for light to be passively transmitted between the first and second waveguide segments via mode hybridization in the overlapping region.

16. The method of claim 15, wherein the first substrate and the second substrate comprise a same semiconductor material.

17. The method of claim 16, wherein, in the overlapping region, a cross section of the first waveguide is the same as a cross section of the second waveguide.

18. The method of claim 15, wherein first substrate and the second substrate comprise different semiconductor materials including at least one of III-V semiconductor material or silicon semiconductor material.

19. The method of claim 15, wherein the segment of the first waveguide is skew to the segment of the second waveguide at a crossing angle such that both TE and TM polarized light is to be efficiently transferred between the waveguide segments.

20. The method of claim 15, wherein the segment of the first waveguide is skew to the segment of the second waveguide at a crossing angle such that one of TE and TM polarized light is to be efficiently transferred between the waveguide segments and that the other of the TE and the TM polarized light is to be inefficiently transferred between the waveguide segments.

* * * * *